United States Patent
Matsuoka et al.

(10) Patent No.: US 9,362,791 B2
(45) Date of Patent: Jun. 7, 2016

(54) MOTOR

(75) Inventors: Atsushi Matsuoka, Tokyo (JP); Kazuhiko Baba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 8 days.

(21) Appl. No.: 14/368,334

(22) PCT Filed: Dec. 27, 2011

(86) PCT No.: PCT/JP2011/080216
§ 371 (c)(1),
(2), (4) Date: Jun. 24, 2014

(87) PCT Pub. No.: WO2013/098940
PCT Pub. Date: Jul. 4, 2013

(65) Prior Publication Data
US 2015/0028708 A1    Jan. 29, 2015

(51) Int. Cl.
*H02K 21/12*    (2006.01)
*H02K 1/27*    (2006.01)

(52) U.S. Cl.
CPC .............. *H02K 1/278* (2013.01); *H02K 1/2766* (2013.01); *H02K 1/2786* (2013.01)

(58) Field of Classification Search
CPC .... H02K 1/278; H02K 1/2766; H02K 1/2786
USPC ........................................ 310/156.07, 156.43
See application file for complete search history.

(56) References Cited

U.S. PATENT DOCUMENTS

| 5,945,760 | A | 8/1999 | Honda et al. |
| 6,140,728 | A | 10/2000 | Tomita et al. |
| 6,717,315 | B1 | 4/2004 | Tajima et al. |
| 2006/0170301 | A1 | 8/2006 | Masuzawa et al. |
| 2008/0218007 | A1* | 9/2008 | Masuzawa et al. ............. 310/44 |

FOREIGN PATENT DOCUMENTS

| DE | 199 39 890 A1 | 3/2000 |
| JP | 63-265553 A | 11/1988 |

(Continued)

OTHER PUBLICATIONS

International Search Report of the International Searching Authority mailed Apr. 3, 2012 for the corresponding international application No. PCT/JP2011/080216 (with English translation).

(Continued)

*Primary Examiner* — Hanh Nguyen
(74) *Attorney, Agent, or Firm* — Posz Law Group, PLC

(57) ABSTRACT

A magnet constituting a magnetic pole of a rotor includes an annular ferrite bond magnet provided on an outer circumference of a rotation shaft and a plurality of sintered ferrite magnets arranged on an outer circumference of the ferrite bond magnet. The ferrite bond magnet includes, on an outer circumferential surface thereof, curved concave portions convexed toward a side of the rotation shaft. The sintered ferrite magnets are arranged on the curved concave portions, and include a surface on a side of the stator that is formed in a curved convex shape toward the side of the stator, and a center portion whose thickness with respect to the circumferential direction is formed to be larger than a thickness of an edge portion, wherein magnetization direction is oriented in polar anisotropy.

7 Claims, 5 Drawing Sheets

(56) References Cited

FOREIGN PATENT DOCUMENTS

| | | | |
|---|---|---|---|
| JP | 02-211032 A | 8/1990 |
| JP | 09-093895 A | 4/1997 |
| JP | 2823817 B2 | 9/1998 |
| JP | 11-089141 A | 3/1999 |
| JP | 2000-078783 A | 3/2000 |
| JP | 2001-298887 A | 10/2001 |
| JP | 2004-242378 A | 8/2004 |
| JP | 2005-057955 A | 3/2005 |
| JP | 2005-287173 A | 10/2005 |
| JP | 4598343 B2 | 10/2010 |

OTHER PUBLICATIONS

Extended European Search Report dated Apr. 13, 2016 issued in corresponding EP patent application No. 11878715.9.

* cited by examiner

MOTOR

CROSS REFERENCE TO RELATED APPLICATION

This application is a U.S. national stage application of International Patent Application No. PCT/JP2011/080216 filed on Dec. 27, 2011.

TECHNICAL FIELD

The present invention relates to a motor.

BACKGROUND

Conventionally, there has been known a motor which includes a rotor including a plurality of sintered magnets arranged at a regular interval in a circumferential direction on an outer circumferential surface of a rotor core. For example, in a motor described in Patent Literature 1 mentioned below, a soft magnetic material (a high-magnetic permeability material) such as iron is used as a back yoke inside a rotor in order to decrease magnetic resistance in a magnetic circuit inside the motor (a stator core and the rotor).

Furthermore, in a rotor described in Patent Literature 2 mentioned below, a ring-shaped bond magnet obtained by kneading powder of a permanent magnet and resin is used as a magnetic pole. The powder of the permanent magnet has anisotropy, and by applying a magnetic field of polar anisotropy to the ring-shaped magnet from outside at the time of manufacturing, its magnetization direction has an orientation of polar anisotropy (hereinafter, "polar anisotropic orientation"). By causing the magnetization direction of the ring-shaped magnet have the polar anisotropic orientation in the above manner, a magnetic flux of a ring magnet is concentrated on the center of the magnetic pole, and hence high magnetization can be achieved even when a bond magnet having a low magnetic property is used. Further, with the polar anisotropic orientation, it is not necessary to provide a back yoke on a side of an inner circumference of the ring-shaped magnet. Therefore, both of reduction of a machining cost and weight reduction of the rotor can be realized at the same time. In addition, the ring-shaped magnet can be manufactured even with a sintered magnet, and because the sintered magnet has a density of magnet higher than that of the bond magnet, a magnetic force higher than that of the bond magnet can be obtained.

PATENT LITERATURE

Patent Literature 1: Japanese Patent Application Laid-open No. H11-89141 (FIG. 1, for example)

Patent Literature 2: Japanese Patent Application Laid-open No. S63-265553 (FIG. 1, for example)

Technical Problem

However, in the conventional rotor described in Patent Literature 1 mentioned above, the soft magnetic material having a large specific gravity such as iron is used as the back yoke, and hence the weight of the rotor is increased, causing a problem of degrading the efficiency. Furthermore, as it is necessary to arrange a plurality of permanent magnets on the outer circumferential surface of the cylindrical back yoke, when arranging the permanent magnets on the outer circumferential surface, a measure is required such as to secure accuracy of a fixing position. Accordingly, there has been a problem that the machining cost is likely to increase. In addition, in the conventional rotor described in Patent Literature 2 mentioned above, there has been a problem that, as the density of magnet of the bond magnet is low, the obtained magnetic force is lower as compared to the sintered magnet. Further, when the ring-shaped magnet is manufactured with the sintered magnet, due to the influence of the polar anisotropic orientation, distortion or a crack is likely to be generated in the magnet at the stage of sintering the magnet and the orientation cannot be sufficiently obtained, and hence a magnet using a magnet property of magnet powder cannot be obtained.

SUMMARY

The present invention has been achieved in view of the above problems, and it is an object of the present invention to obtain a motor that can achieve a high magnetic force without arranging a back yoke inside a rotor.

The present invention is directed to a motor that achieves the object. The motor includes a stator, and a rotor arranged on a side of an inner diameter of the stator, having a magnet constituting a magnetic pole thereof. The magnet includes a first magnet provided on an outer circumference of a rotation shaft and a plurality of second magnets arranged on an outer circumference of the first magnet, having a magnetic property higher than that of the first magnet. The first magnet includes, on an outer circumferential surface thereof, concave portions that are formed at a regular pitch to a circumferential direction. The concave portions are formed so that the number thereof is identical to the number of the magnetic poles. Each of the second magnets is arranged on each of the concave portions, and includes a center portion whose thickness with respect to the circumferential direction is formed to be larger than thickness of an edge portion. The first magnet is oriented in polar anisotropy so that the magnetic poles appear on each of the concave portions in an alternate manner and a magnetic flux flows from one of adjacent concave portions to the other.

According to the present invention, it is possible to achieve a high magnetic force without arranging a back yoke inside a rotor.

DETAILED DESCRIPTION

Exemplary embodiments of a motor according to the present invention will be explained below in detail with reference to the accompanying drawings. The present invention is not limited to the embodiments.

Embodiment

Figure 1:
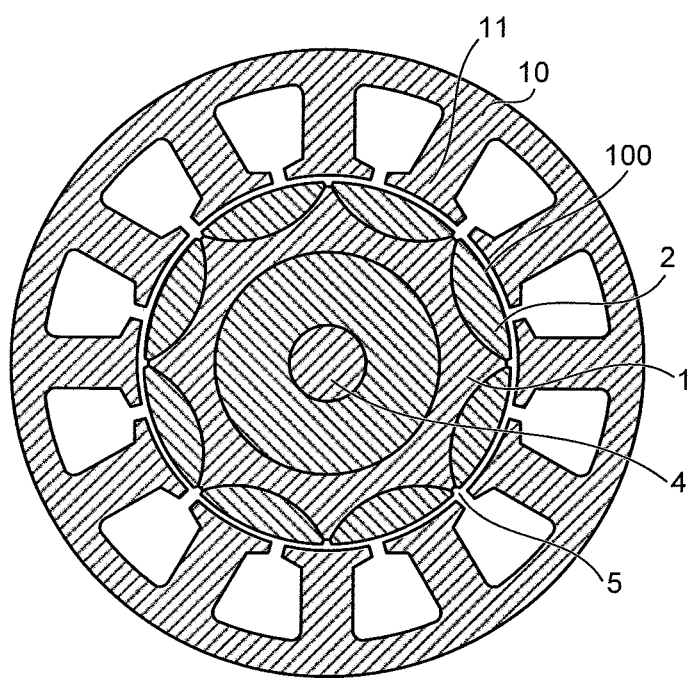
FIG. 1 is a cross-sectional view of a motor according to an embodiment of the present invention.
Figure 2:
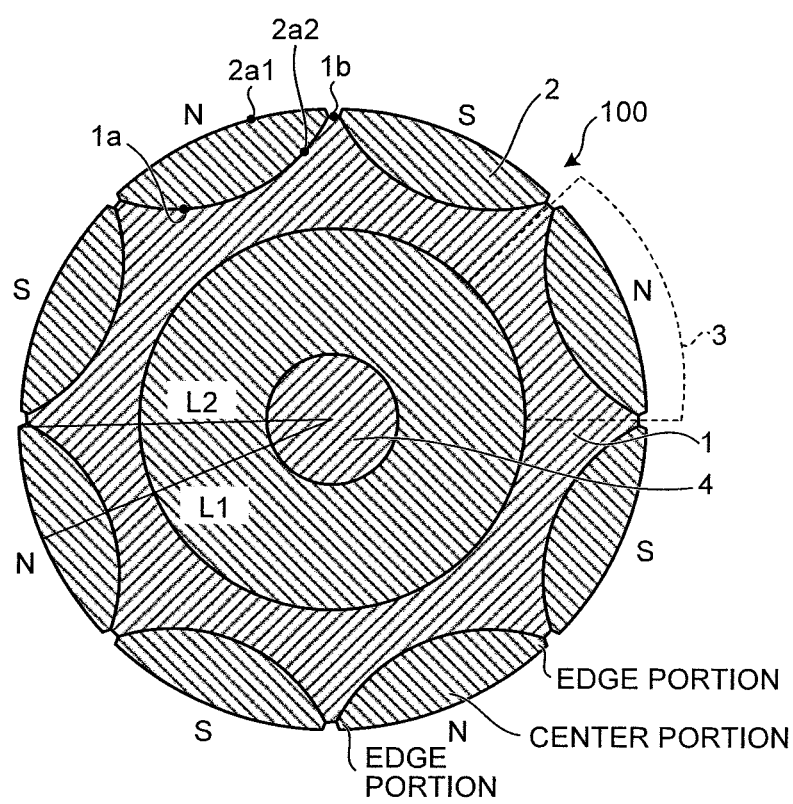
FIG. 2 is a cross-sectional view of a structure of a rotor shown in FIG. 1.
Figure 3:
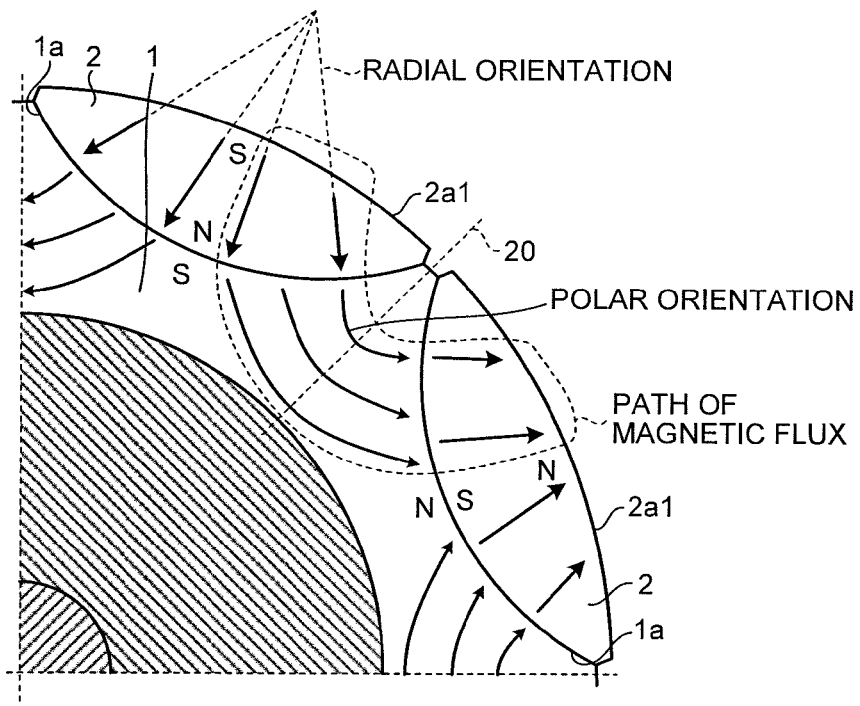
FIG. 3 is a cross-sectional view of a direction of magnetization and a flow of a magnetic flux of a magnet of the rotor shown in FIG. 2.

FIG. 1 is a cross-sectional view of a motor according to an embodiment of the present invention, FIG. 2 is a cross-sectional view of a structure of a rotor 100 shown in FIG. 1, and FIG. 3 is a cross-sectional view of a direction of magnetization and a flow of a magnetic flux of a magnet of the rotor 100 shown in FIG. 2.

In FIG. 1, the motor according to the embodiment of the present invention includes a stator 10 and the rotor 100. The stator 10 is an annular core including a plurality of teeth 11 formed at an equiangular pitch in a circumferential direction (a rotation direction of the rotor 100) inside the stator 10 and a winding (not shown) wound around each of the teeth 11 and to which a voltage is applied from outside. The winding wound around the teeth 11 can be a concentrated winding or a distributed winding. In the case of the distributed winding, the magnetic flux generated by the winding of the stator 10 is uniformly distributed, and hence vibration and noise can be further reduced. The rotor 100 is rotatably arranged on a side of an inner diameter of the stator 10 with a gap 5 between an outer circumferential surface of the rotor 100 and the teeth 11.

The rotor 100 shown in FIG. 2 includes, as main configurations, a rotation shaft 4 for transferring rotation energy, a ferrite bond magnet 1 (hereinafter, simply "magnet 1") provided on an outer circumferential portion of the rotation shaft 4 and a sintered ferrite magnet 2 (hereinafter, simply "magnet 2") provided on a side of an outer circumference of the magnet 1. Furthermore, a ferrite bond magnet is provided between the rotation shaft 4 and the magnet 1, similarly to the magnet 1.

The magnet 1 has an annular shape and is provided on the outer circumferential portion of the rotation shaft 4. On an outer circumferential surface of the magnet 1, as many curved concave portions 1a as the number of magnetic poles 3 (an N pole and an S pole) are formed, which are formed at a regular pitch on the same circumference along the circumferential direction and are convexed toward the side of the rotation shaft 4. In the rotor 100 shown in FIG. 2, for example, eight magnetic poles 3 are formed, which are consist of the magnet 1 and the magnet 2.

Each of the curved concave portions 1a is formed in a shape substantially the same as an inner diameter side surface 2a2 of the magnet 2, and the magnet 2 is arranged on each of the curved concave portions 1a. By arranging the magnet 2 on each of the curved concave portions 1a, the magnet 1 is interposed between adjacent magnets 2 (a space 20 between the poles), and hence an outer circumferential portion 1b of the magnet 1 is formed on substantially the same circumference as an outer diameter side surface 2a1. In order to prevent a crack of the magnet or the like, the outer circumferential portion 1b of the magnet 1 shown in FIG. 2 is provided on an inner side in a radial direction than an arc surface formed by a radius from the center of the rotor to the outer diameter side surface 2a1.

It is preferred that a magnet having a magnetic property lower than that of the magnet 2 is used as the magnet 1. Although a certain degree of the magnetic property is required, it is preferable to use a material that can achieve the featured shape (the curved concave portions 1a) shown in FIG. 2 rather than performance of the magnet, and hence it is preferable to use a ferrite bond magnet that can be easily molded.

The magnet 2 is arranged on each of the curved concave portions 1a of the magnet 1, a surface on a side of the stator (the outer diameter side surface 2a1) is formed in a curved convex shape toward the side of the stator, and a surface on a side of the rotation shaft (the inner diameter side surface 2a2) is formed in a curved convex shape toward the side of the rotation shaft, which is substantially identical to the shape of each of the curved concave portions 1a. Furthermore, the magnet 2 is formed in a manner that the thickness of a center portion is larger than the thickness of an edge portion in the circumferential direction. That is, the magnet 2 is formed in a manner that the thickness is gradually decreased from the center portion toward both edge portions, so that its cross section is formed in a so-called "lens shape".

The outer diameter side surface 2a1 of the magnet 2 is formed in a manner that its arc center is substantially the same as the arc center of an inner diameter surface of the stator 10 (an inner diameter surface of the teeth 11). That is, the magnet 2 is formed in a manner that a length L1 from the center portion of the outer diameter side surface 2a1 in the circumferential direction to the center of the rotor and a length L2 from the edge portion of the outer diameter side surface 2a1 in the circumferential direction to the center of the rotor are substantially equal to each other. Therefore, a space (the gap 5) between the center portion of the magnet 2 and the teeth 11 and a space between the edge portion of the magnet 2 and the teeth 11 are substantially equal to each other. In other words, the gap 5 with a constant width is formed between the arc surface formed by the radius from the center of the rotor to the outer diameter side surface 2a1 and the inner diameter surface of the teeth 11.

It is preferable to use a material having a magnetic property higher than that of the magnet 1 as a material of the magnet 2. For example, as the magnet 2, a high-performance rare-earth magnet can be used as the magnet 2. However, because each of the side of the rotation shaft and the side of the stator is formed in a convex shape as shown in FIG. 2, a volume of the magnet is increased. Therefore, when the expensive rare-earth magnet is used as the magnet 2, not only the manufacturing cost of the rotor 100 is increased, but also the shape of the magnet is limited due to difficulty in molding. Therefore, it is preferable to use the ferrite sintered magnet that is inexpensive and easily molded.

In FIG. 3, the magnet 1 is configured to have a polar anisotropic orientation such that the magnetic poles (the N pole and the S pole) appear at each of the curved concave portions 1a. Furthermore, each of the magnets 2 is magnetized in a manner that a focal point of the magnetization orientation is on a line connecting the center of the rotor 100 and the center portion of the magnet 2 and on an outer side of the rotor 100 (a side of the stator 10). That is, the magnet 2 is magnetized in a radial orientation of an opposite direction.

In the rotor 100 according to the present embodiment, because the magnet 1 is interposed in the space 20 between the poles, when the magnet 1 is formed in a manner that the magnetization orientation becomes the polar anisotropic orientation, the magnetic flux flowing from the outer diameter side surface 2a1 of the magnet 2 flows out again from the outer diameter side surface 2a1 of the magnet 2 through a path shown in FIG. 3. For example, the magnetic flux flowing from the outer diameter side surface 2a1 of the magnet 2 shown on the upper side of FIG. 3 flows into the magnet 1 from an inter-pole side surface of the curved concave portion 1a having contact with the magnet 2, flows into the magnet 2 from an inter-pole side surface of the curved concave portion 1a having contact with the magnet 2 shown on the lower side of FIG. 3, and flows out from the outer diameter side surface 2a1. However, the magnetic flux flowing from the outer diameter side surface 2a1 of the magnet 2 hardly flows into the center side of the rotor 100. That is, the magnetic flux flowing into the rotor 100 is not leaked inside the rotor 100.

As described above, in the rotor 100 according to the present embodiment, the magnet 1 is interposed in the space 20 between the poles and is magnetized in a manner that the magnetization orientation becomes the polar anisotropic orientation, and hence a magnetic path is formed near a circumferential side inside the rotor, and the magnetic flux is concentrated near the center of each of the magnetic poles 3 (the center portion of the magnet 2 in the circumferential direction). Therefore, the rotor 100 according to the present embodiment can obtain a high magnetic force even without arranging a core (a back yoke) that becomes a path of the magnetic flux inside the rotor 100, and hence the weight of the rotor can be reduced as compared to the conventional rotor having a back yoke.

In the case where the back yoke is not provided inside the rotor 100, usually a gap other than the back yoke (a space inside the rotor) is increased, and this space becomes magnetic resistance on a magnetic circuit, so that the magnetic flux generated from the permanent magnet (the magnet 2) is degraded. However, in the rotor 100 according to the present embodiment, the magnet 1 and the magnet 2 are arranged in series in the path of the magnetic flux inside the rotor (see FIG. 3), and hence the magnetic flux obtained by adding the magnetic flux of the magnet 1 to the magnetic flux of the magnet 2 is generated from the rotor 100. That is, because the magnetic force of the magnet 2 is compensated by the magnetic force of the magnet 1, the rotor 100 having a larger magnetic force can be realized. Furthermore, in the magnet 2 according to the present embodiment, the surface on the side of the stator is formed in a curved convex shape toward the side of the stator and the surface on the side of the rotation shaft is formed in a curved convex shape toward the side of the rotation shaft, and hence the thickness of the center portion of the magnet 2 in the circumferential direction is increased, so that a stronger magnetic force can be obtained.

The outer diameter side surface 2a1 of the magnet 2 according to the present embodiment is formed in a manner that the arc center is substantially the same as the arc center of the inner diameter surface of the stator 10. Therefore, as compared to a case where the outer diameter side surface 2a1 of the magnet 2 is formed in a manner that the arc center is different from the arc center of the inner diameter surface of the stator 10, the gap 5 between the magnet 2 and the stator 10 is decreased, and hence the amount of an effective magnetic flux interlinked with the stator 10 is increased. That is, a large amount of the magnetic flux from the rotor 100 is interlinked with the winding of the stator 10, and hence high performance of the motor can be achieved.

Figure 4:
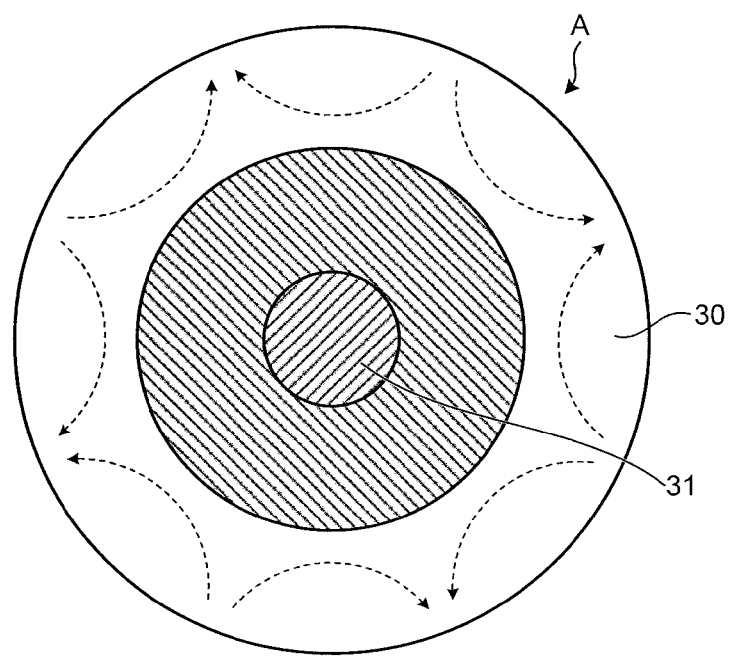
FIG. 4 is a cross-sectional view of a first structure of a conventional rotor.
Figure 5:
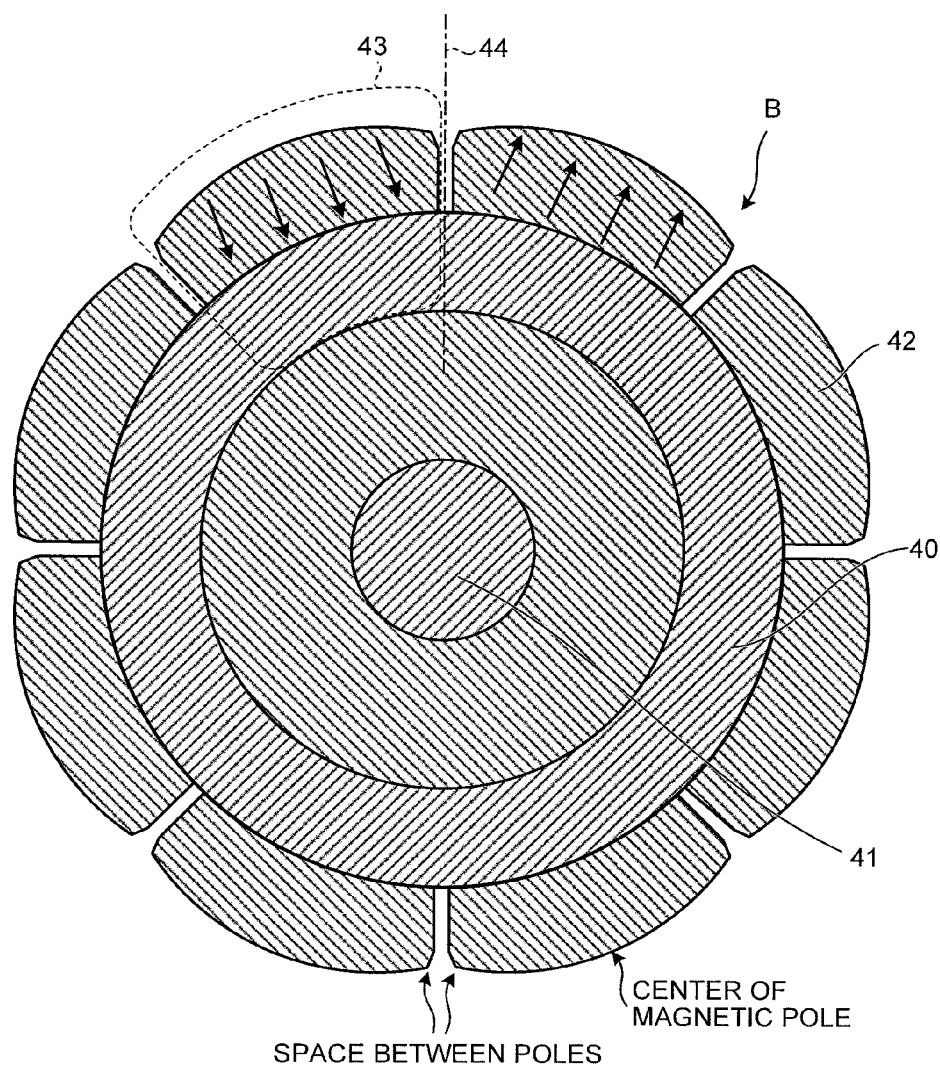
FIG. 5 is a cross-sectional view of a second structure of the conventional rotor.
Figure 6:
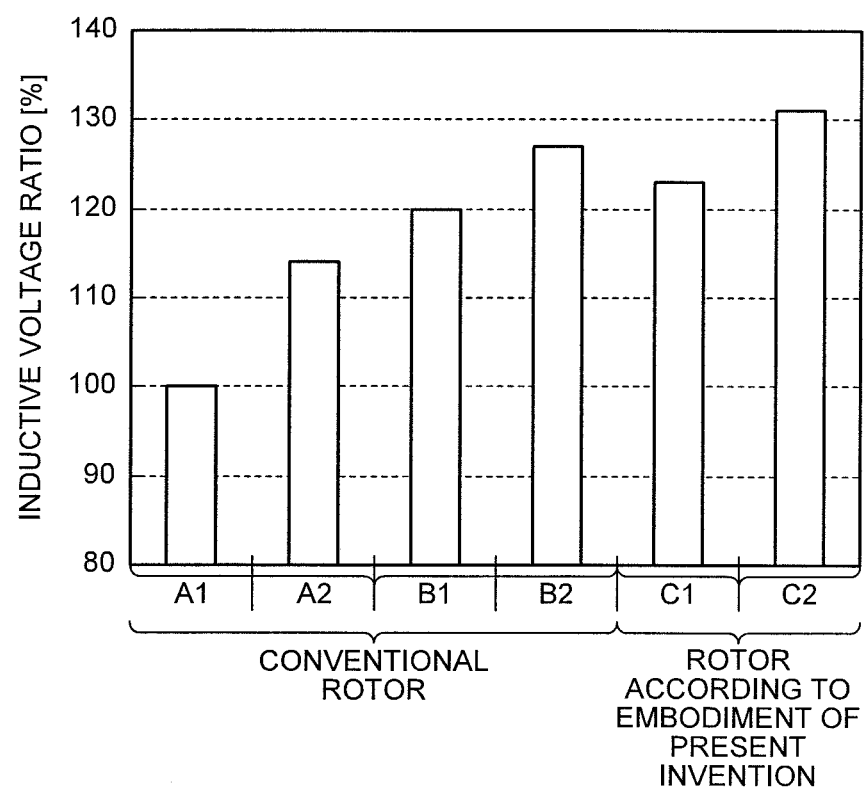
FIG. 6 is a graph showing a ratio of an inductive voltage generated by a conventional motor and an inductive voltage generated by the motor according to the embodiment of the present invention.

FIG. 4 is a cross-sectional view of a first structure of a conventional rotor and FIG. 5 is a cross-sectional view of a second structure of the conventional rotor. FIG. 6 is a graph showing a ratio of an inductive voltage generated by a conventional motor and an inductive voltage generated by the motor according to the embodiment of the present invention.

A rotor A shown in FIG. 4 includes a rotation shaft 31 and a ring magnet 30 provided on an outer circumferential portion of the rotation shaft 31. The ring magnet 30 is magnetized in a manner that the magnetization direction becomes the polar anisotropic orientation.

A1 in FIG. 6 indicates the inductive voltage of a motor including the rotor A that employs a ferrite bond magnet as a material of the ring magnet 30. In the following descriptions, this rotor is referred to as "rotor A1". A2 in FIG. 6 indicates the inductive voltage of a motor including the rotor A that employs a sintered ferrite magnet as the material of the ring magnet 30. In the following descriptions, this rotor is referred to as "rotor A2".

A rotor B shown in FIG. 5 includes a rotation shaft 41, a ring-shaped back yoke 40 provided on an outer circumferential portion of the rotation shaft 41, and a permanent magnet 42 provided on an outer circumferential surface of the back yoke 40. The permanent magnet 42 is a ferrite sintered magnet with both an outer diameter side surface and an inner diameter side surface formed in a curved convex shape toward the side of the stator 10, of which a cross section is a so-called "roof tile shape". Furthermore, the same material as the back yoke 40 is provided between the rotation shaft 41 and the back yoke 40.

The permanent magnet 42 shown in FIG. 5 is formed in a manner that an arc radius of an outer diameter surface is smaller than an arc radius of an outer circumferential surface of the back yoke 40. More specifically, the magnet 2 according to the present embodiment is formed in a manner that the arc center of the outer diameter surface is substantially the same as the arc center of the inner diameter surface of the stator 10. On the other hand, the permanent magnet 42 shown in FIG. 5 is formed in a manner that the arc center of the outer diameter surface is different from the arc center of the inner diameter surface of the stator 10. A space is then provided between adjacent permanent magnets 42 (a space 44 between the poles). Therefore, a diameter of the rotor B is maximized at the center portion of a magnetic pole 43 in the circumferential direction (the center of the magnetic pole 43) and minimized at the space 44 between the poles.

B1 in FIG. 6 indicates the inductive voltage of a motor including the rotor B shown in FIG. 5. In the following descriptions, this rotor is referred to as "rotor B1". On the other hand, B2 in FIG. 6 indicates the inductive voltage of a motor including the rotor B that employs a permanent magnet obtained by modifying the shape of the permanent magnet 42 shown in FIG. 5. In the following descriptions, this rotor is referred to as "rotor B2". The rotor B2 is formed in a manner that the arc center of the outer diameter surface of the permanent magnet 42 is substantially the same as the arc center of the inner diameter surface of the stator 10 and an arc surface formed by a radius from the center of the rotor to the outer diameter surface of the permanent magnet is smooth and formed in a circular shape. Furthermore, the permanent magnet 42 is formed in a manner that the magnetization direction becomes a parallel orientation.

C1 and C2 in FIG. 6 indicate the inductive voltage of a motor including the rotor 100 shown in FIG. 2. It is assumed that, in the rotor 100, a ferrite bond magnet is used as the magnet 1 and a sintered ferrite magnet is used as the magnet 2.

C1 indicates the inductive voltage of a motor including the rotor 100 in which the magnetization orientation of the magnet 1 is the polar anisotropic orientation and the magnetization orientation of the magnet 2 is the parallel orientation. In the following descriptions, this rotor is referred to as "rotor C1". C2 indicates the inductive voltage of a motor including the rotor (the rotor 100 shown in FIG. 3) in which the magnetization orientation of the magnet 1 is the polar anisotropic orientation and the magnetization orientation of the magnet 2 is the radial orientation of the opposite direction. In the following descriptions, this rotor is referred to as "rotor C2".

Magnetic materials having the same property are used for the permanent magnets of the rotors described above, and similarly materials having the same magnetic property are used for the sintered magnets and materials having the same magnetic property are used for the bond magnets. The thickness of the sintered magnet is the same for the rotors B1, B2, C1, and C2. However, as described in the problem of Patent Literature 2 mentioned above, the ring magnet 30 of the sintered magnet of the rotor A2 cannot achieve a sufficient orientation, and hence it is assumed that its property is set to a degraded magnetic property.

In FIG. 6, the inductive voltage of the motor employing the rotor A1 is set to 100, and ratios of the inductive voltages of the motors employing rotors A2 to C2 with respect to the inductive voltage of the motor employing the rotor A1 are shown. The inductive voltages are calculated by using electromagnetic field analysis. From FIG. 6, it is founds that, in the rotor B1 of the sintered magnet including the back yoke 40, the inductive voltage higher than that of the rotor A1 including the ring magnet 30 of the bond magnet can be obtained. Furthermore, in the rotor B2 of the sintered magnet including the back yoke 40, because the gap between the outer circumferential surface of the permanent magnet 42 and the stator 10 is narrower than that in the case of using the rotor B1, the amount of an effective magnetic flux interlinked with the stator 10 is increased, and hence the inductive voltage higher than that of the rotor B1 can be obtained. In contrast thereto, in the rotor C1, the inductive voltage equivalent to those of the rotors B1 and B2 can be obtained. Further, in the rotor C2, the inductive voltage equal to or higher than those of the rotors B1 and B2 can be obtained.

In a synchronous motor (not shown) including a drive circuit, when a soft magnetic material having high conductivity is used for a rotor inside the motor, a high frequency current (a shaft current) generated at the drive circuit is likely to flow to a roller bearing through the stator core, the rotor, and the rotation shaft, which is likely to be a factor for an electric corrosion (discharge) of the bearing. Because the rotor 100 according to the present embodiment does not need to use the soft magnetic material, the factor of causing the shaft current can be reduced. Although this effect is equivalent to the effect in the case where the ring magnet 30 of the rotor A has the polar anisotropic orientation, the rotor 100 according to the present embodiment can achieve the magnetic force larger than that of the rotor A.

As described above, the motor according to the present embodiment is a motor including the rotor 100 arranged on the side of the inner diameter of the stator 10, in which the magnet constituting the magnetic pole 3 of the rotor 100 includes the annular ferrite bond magnet 1 provided on the outer circumference of the rotation shaft 4 and the plurality of sintered ferrite magnets 2 arranged on the side of the outer circumference of the ferrite bond magnet 1. On the outer circumferential surface of the ferrite bond magnet 1, as many curved concave portions 1a as the number of magnetic poles 3 are formed, which are formed at a regular pitch on the same circumference along the circumferential direction and are convexed toward the side of the rotation shaft, each of the sintered ferrite magnets 2 is arranged on each of the curved concave portions 1a, the surface (the outer diameter side surface 2a1) on the side of the stator is formed in a curved convex shape toward the side of the stator, the surface (the inner diameter side surface 2a2) on the side of the rotation shaft is formed in a curved convex shape toward the side of the rotation shaft in a shape substantially identical to the curved concave portion 1a, the thickness of the center portion with respect to the circumferential direction is formed to be larger than the thickness of the edge portion, and the magnetic poles (the N pole and the S pole) are oriented in polar anisotropy to appear on each of the curved concave portions 1a in an alternate manner so that the magnetic flux flows from one of adjacent curved concave portions 1a to the other. Therefore, the thickness of the center portion of the magnet 2 in the circumferential direction is increased to obtain a strong magnetic force, and the magnetic flux is concentrated near the center of the magnetic pole 3 as the magnetic path is formed near the side of the outer circumference inside the rotor. Accordingly, the rotor 100 having a high magnetic force can be obtained without arranging a back yoke inside the rotor 100, and at the same time, the weight of the rotor can be reduced as compared to the conventional rotor employing the back yoke.

The outer diameter side surface 2a1 of the sintered ferrite magnet 2 according to the present embodiment is formed in a manner that the arc center is substantially the same as the arc center of the inner diameter surface of the stator 10, and hence the gap 5 between the magnet 2 and the stator 10 is decreased, as compared to the case where the arc center of the outer diameter side surface 2a1 is formed to differ from the arc center of the inner diameter surface of the stator 10 (see the permanent magnet 42 shown in FIG. 5), the amount of an effective magnetic flux interlinked with the stator 10 is increased, and the high performance of the motor can be achieved.

The sintered ferrite magnet 2 according to the present embodiment is magnetized in a manner that the focal point of the magnetization orientation is on the line connecting the center of the rotor 100 and the center portion of the magnet 2 and on the outer side of the rotor 100, and hence the magnetization orientation (the radial orientation) and the polar anisotropic orientation of the ferrite bond magnet 1 are combined, to constitute a structure similar to a magnet of the polar anisotropic orientation as the whole magnet of the rotor 100. Therefore, the magnetic flux is concentrated on the center of the magnet pole to increase the magnetic flux density at the center of the magnet pole, and hence the magnetic force of the rotor 100 can be further increased.

The configuration of the motor according to the embodiment of the present invention is only an example of the contents of the present invention. The configuration can be combined with other well-known techniques, and it is needless to mention that the present invention can be configured while modifying it without departing from the scope of the invention, such as omitting a part of the configuration.

INDUSTRIAL APPLICABILITY

As described above, the present invention is applicable to a motor, and is particularly useful as an invention that can achieve a high magnetic force without arranging a back yoke inside a rotor.

The invention claimed is:

1. A motor comprising:
a stator; and
a rotor being arranged on a side of an inner diameter of the stator and including a magnet constituting a magnetic pole thereof, the magnet includes,
   a first magnet provided on an outer circumference of a rotation shaft, and
   a plurality of second magnets arranged on an outer circumference of the first magnet, and the plurality of second magnets have a magnetic property higher than that of the first magnet, wherein
the first magnet includes, on an outer circumferential surface thereof, concave portions that are formed at a regular pitch to a circumferential direction, the concave portions being formed so that the number thereof is identical to the number of the magnetic poles, and
each of the plurality of second magnets is arranged on each of the concave portions of the first magnet, and each of the plurality of second magnets has a center portion whose thickness with respect to the circumferential direction is larger than a thickness of an edge portion, and the plurality of second magnets extend beyond the outer circumferential surface of the first magnet, and the first magnet is oriented in polar anisotropy so that the magnetic poles appear on each of the concave portions in an alternate manner and a magnetic flux flows from one of adjacent concave portions to the other.

2. The motor according to claim 1, wherein the plurality of second magnets include an outer diameter side surface that is formed so that an arc center thereof is the same as an arc center of an inner diameter surface of the stator.

3. The motor according to claim 1, wherein the plurality of second magnets are magnetized so that a focal point of a magnetization orientation is on a line connecting a center of the rotor and a center portion of the magnet and on an outer side of the rotor.

4. The motor according to claim 1, wherein each of the concave portions of the first magnet is in a curved shape convexed toward the side of the rotation shaft.

5. The motor according to claim 1, wherein the first magnet is a ferrite bond magnet, and the plurality of second magnets are sintered ferrite magnet.

6. The motor according to claim 1, wherein the first magnet has a magnetic property of the first magnet similar to a ferrite bond magnet, and the magnetic property of the plurality of second magnets being similar to a sintered ferrite magnet.

7. The motor according to claim 1, wherein the magnetic flux that flows from an outer diameter side surface of the plurality of second magnets flows towards a center side of the rotor without flowing substantially through the center side of the rotor.

* * * * *